Figure 1:
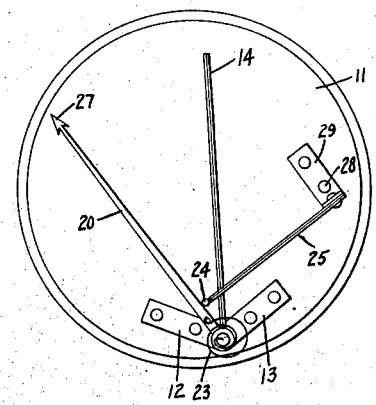

March 22, 1938.  T. A. RICH  2,112,047

THERMAL CURRENT-RESPONSIVE DEVICE

Filed Feb. 5, 1936  2 Sheets-Sheet 1

Inventor:
Theodore A. Rich,
by Harry E. Dunham
His Attorney.

March 22, 1938.  T. A. RICH  2,112,047
THERMAL CURRENT-RESPONSIVE DEVICE
Filed Feb. 5, 1936   2 Sheets-Sheet 2
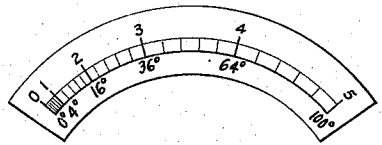
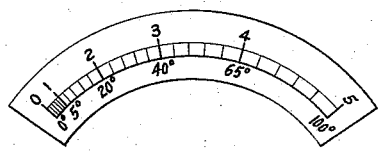
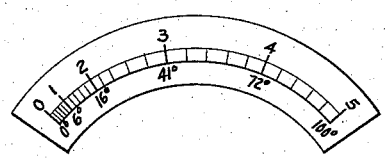
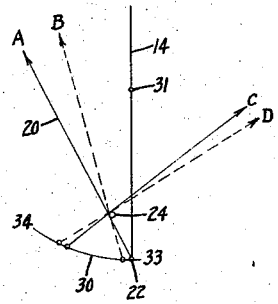
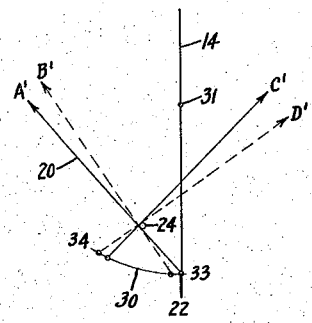
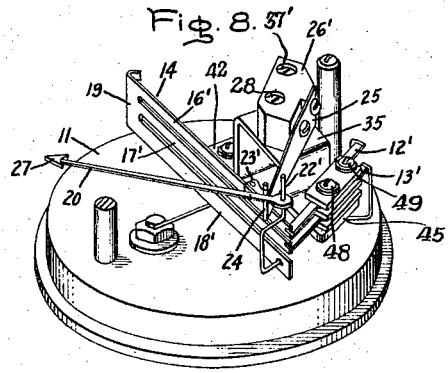
Inventor:
Theodore A. Rich,
by Harry E. Dunham
His Attorney.

Patented Mar. 22, 1938

2,112,047

UNITED STATES PATENT OFFICE 2,112,047

THERMAL CURRENT-RESPONSIVE DEVICE

Theodore A. Rich, Schenectady, N. Y., assignor to General Electric Company, a corporation of New York Application February 5, 1936, Serial No. 62,443

10 Claims. (Cl. 171—271)

My invention relates to current-responsive devices and concerns particularly devices of the thermal type employing bimetallic strips.

It is an object of my invention to provide an arrangement for overcoming or compensating the variations in the effect of radiation with variations in ambient temperature.

Other and further objects and advantages will become apparent as the description proceeds.

Current-responsive instruments of the deflecting bimetallic type have the advantages of high torque and high current-carrying capacity. However, owing to the fact that the deflection of the elements is caused by variations in the temperature thereof produced by variations in the current being measured, such current-responsive instruments are affected by variations in the temperature of the atmosphere surrounding the instrument. It is well known that the direct influence of variations in ambient temperature on the temperature of the bimetallic strips at zero current may be compensated by providing oppositely acting bimetallic strips, one of which is influenced only by the ambient temperature so that its deflection cancels the effect of ambient temperature on the current-responsive strip or strips. However, there is another error which cannot be compensated in this way. The actual temperature of the current-carrying portions of the instrument depends upon the radiation of heat therefrom as well as upon the amount of heat produced by current. The rate of radiation, in turn, depends upon the difference in temperature of the heat-producing element and the surrounding atmosphere, consequently, variations in ambient temperature affect the temperature and reading of the instrument by influencing the rate of radiation.

In carrying out my invention in its preferred form, I provide bimetallic strips arranged to be heated by the current to be measured and having a pointer deflected by the twisting or bending of the bimetallic strip. However, instead of fastening the pointer rigidly to the bimetallic strip, I provide a lever or linkage arrangement through which the pointer is deflected by the bending of the bimetallic strip. I also provide an arrangement for changing the ratio between the deflections of the bimetallic strip and the pointer in response to variations in ambient temperature in order to compensate for the variations in radiation.

The invention will be understood more readily from the following detailed description when considered in connection with the accompanying drawings and those features of the invention which are believed to be novel and patentable will be pointed out in the claims appended hereto.

Figure 9:
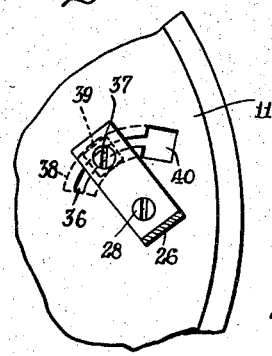
Figure 2:
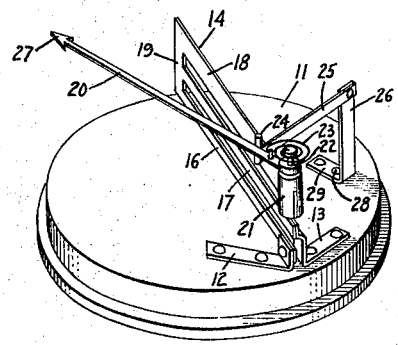
Figure 10:
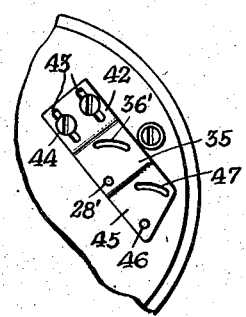

In the drawings, Fig. 1 is a plan view of an instrument constituting one embodiment of my invention and having the cover and scale thereof removed for the sake of clearness; Fig. 2 is a perspective view of the apparatus of Fig. 1; Fig. 3 illustrates a square law scale which would theoretically be obtained in a thermal instrument were all disturbing factors eliminated so that the deflection would truly vary as the heat produced or as the square of the current; Fig. 4 illustrates a typical scale which may be obtained in an actual bimetallic type instrument with the usual ambient temperature compensation; Fig. 5 illustrates a scale which may be obtained with a given adjustment of apparatus constructed as illustrated in Fig. 1; Figs. 6 and 7 are schematic diagrams explaining the principle of operation of the linkage employed in the apparatus of Fig. 1; Fig. 8 is a perspective view of another embodiment of my invention; Fig. 9 is a fragmentary detailed view of a portion of the apparatus of Fig. 2, showing the arrangement for obtaining adjustable mounting; and Fig. 10 is a fragmentary detailed view of a portion of the apparatus of Fig. 8 showing the manner in which adjustability of the mounting is obtained in this embodiment of the invention.

Like reference characters are utilized in the drawings to designate like parts throughout. For the sake of illustration, I have shown the application of my compensating arrangement to a quick-acting bimetallic type current-responsive instrument, in which there is a pointer carrying arm serving for ambient temperature compensation and also arranged to receive heat from the other two arms for the purpose of diminishing creepage which is inherent in instruments of the thermal type and tends to produce an objectionable time lag of response. It will be understood that my present invention is not limited thereto.

Upon a suitable base 11 of insulating material, I mount a pair of brackets 12 and 13, serving as current-conducting terminals, to which are attached leads from an electrical circuit in which the current is to be measured. The terminals 12 and 13 support a bimetallic current-responsive unit 14 comprising bimetallic arms arranged to be heated and deflected by the current supplied to the terminals 12 and 13. Although I prefer to pass the current to be measured or a portion thereof directly through the current-responsive arms of the unit 14, it will be understood that my invention is not limited to this specific arrangement for heating of the arms in response to the current to be measured.

In the arrangement illustrated, the current and heat-responsive bimetallic unit 14 takes the form of an integral E-shaped piece of bimetal having arms 16, 17, and 18 joined by the yoke portion 19. Although separate strips of bimetal joined by a suitable member at the end 19 may also be employed, I find it economical and satisfactory to stamp the three-legged or E-shaped figure for the current-responsive torque-producing element directly from a sheet of bimetal.

The bimetal to which I refer is a well known article of commerce which consists of two sheets or strips of material having different temperature coefficients of expansion laid together and united along their common surfaces in any suitable manner, as by welding. For example, brass and steel are commonly employed and, in that case, since brass has the greater temperature coefficient of expansion, as the temperature rises, the bimetal would bend away from the side composed of brass and, as the temperature diminishes, it would bend away from the side composed of steel.

In the instrument illustrated in Figs. 1 and 2, the brass portion of the bimetallic unit 14 is on the left-hand side and the steel portion is on the right-hand side. The ends of the lower arms 16 and 17 are attached to the brackets 12 and 13 in any suitable manner so that the arms 16 and 17 serve as the current-conducting arms and the current-free arm 18 serves as an ambient temperature compensating arm.

At the end of the current-free arm 18 away from the yoke 19, an indicating pointer 20 is pivotally mounted. Any suitable type of mounting may be employed, for example, a forked piece 21 carrying a pin 22 at the upper end thereof may be clamped or riveted upon the end of the current-free arm 18. The pointer 20 has an opening fitting the pin 22 and permitting the pointer 20 to rotate freely on the pin 22. The pointer 20 is biased in a given direction of rotation, however, in some suitable manner as by means of the biasing spring 23 connected at one end to the top of the pin 22 and at the other end to the pointer 20. Since brass has a greater coefficient of expansion than steel, as the current in the arms 16 and 17 increases, there will be a tendency for the brass side of the bimetallic unit 14 to expand, bending the unit 14 and causing all the parts to tend to rotate in a clockwise direction, viewed from above. The arrangement of the biasing spring 23 is such that it tends to rotate the pointer 20 in the same direction, that is, in the clockwise direction in the particular construction shown.

A stop 24 is provided against which the pointer 20 is urged by the spring 23. The stop 24 is carried at the end of or may form the end of a radiation compensating unit 25 which consists of a strip of bimetal supported at its stationary end by means of a bracket 26 mounted upon the base 11. The bimetallic strip 25 is arranged with the brass or the high coefficient of expansion side away from the pivot axis 22 of the pointer 20. The stop 24 is shown as coming between the pivot axis 22 and the index end 27 of the pointer 20. It will be understood, of course, that the arrangement of the biasing spring 23 and the direction of deflection of the bimetallic strip 25 would be suitably modified in case it were desired to provide an extension on the pointer 20 on the side of its pivot away from the index 27 and to have the stop 24 engage such an extension.

The position of the parts shown in the drawings represents a condition of no current and an average ambient temperature. It will be seen that the radiation compensating bimetallic strip 25 is transverse to the pointer 20 and approximately perpendicular thereto and that the current-responsive bimetallic unit 14 makes an angle of approximately 45 degrees with the pointer 20 and the radiation compensating bimetallic strip 25.

Assuming that the ambient temperature is constant and that the current conditions in the arms 16 and 17 have reached a fixed value so that the radiation effect is also constant, a slight increase in current will tend to deflect the yoke end 19 of the unit 14 to the right and the other end of the current-free arm 18 to the left, thus moving the pivot pin 22 of the pointer 20 to the left and the index end 27 to the right. Owing to the action of the biasing spring 23, the pointer 20 remains against the stop 24 which, therefore, acts as a fulcrum. The degree of deflection of the index 27, of course, depends upon the relative lengths of the lever arms from the stop 24 to the pin 22 and from the stop 24 to the index 27.

When there is no current through the instrument, the extremities of the E-shaped unit 14 are in line regardless of the ambient temperature, although the unit 14 will take on different curvatures according to variations in ambient temperature. Since the radiation compensating bimetallic strip 25 is normally substantially at right angles to the pointer 20 when the pointer is at zero, small movements of the fulcrum or stop 24 on the radiation compensating strip 25 responding to variations of ambient temperature will have no effect on the pointer 20 and it will remain in its zero position.

When there is a current flowing in the instrument, the end of the current-free arm 18 carrying the pin 22 tends to deflect according to the magnitude of the current. Since the actual deflection depends upon the difference in temperatures between the current-carrying arms 16 and 17 and the current-free arm 18, radiation of heat from the current-carrying arms will introduce an error in the deflection, tending to diminish the deflection. However, the radiation compensating strip 25 changes the fulcrum so that the relative deflection of the pointer 20 is increased with higher ambient temperatures and higher radiation errors in order to compensate for radiation. When the temperature of the strip 25 rises, it bends and carries the stop 24 toward the pin 22 to cause a given deflection of the pin 22 to cause a greater deflection than before of the pointer 20. The full scale setting of the instrument may be adjusted without affecting the zero setting by changing the mounting position of the radiation compensating strip 25, either rotating the bracket 26 about the mounting screw 28 or sliding the bracket 26 on the base 11 parallel to the base portion 29 of the bracket 26. The adjustable mounting of the bracket 26 may be accomplished in any desired manner as, for example, by having suitably elongated holes or having T-slots in the base 11 for cooperation with the screws fastening the portion 29 of the bracket 26 to the base 11. In the arrangement represented by Fig. 9, the bracket 26 is pivoted about the screw 28 and there is an arcuate T-slot 36 in the base 11 for receiving a screw 37, securing the portion 29 of the bracket 26 to the base 11. The T-slot 36 has an undercut portion 38 represented by dotted lines in order that a nut 39, into which the screw 37 is threaded, may be received within base 11. At one end of the T-slot 36 the overhanging flanges are cut away to form an opening 40 of sufficient size to receive the nut 39 when the apparatus is being assembled.

The linkage employed in my apparatus also has the advantage of facilitating compensation of various other errors and permitting variations in the scale law. In instruments of the thermal type or other types in which the effect theoretically varies as the square of the current, a square law scale, such as illustrated in Fig. 3, would be obtained if there were no disturbing factors such as losses or lack of constancy of characteristics. In Fig. 3, the angular distance from zero to any numerical graduation varies as the square of the number represented by the graduation. In an actual bimetal instrument having its pointer connected directly to the current-free arm, the pointer would not, however, deflect strictly as the square of the current owing to heat losses increasing with current, and a scale more nearly like that of Fig. 4 would be obtained in which the upper portion of the scale is expanded to a lesser extent than in Fig. 3.

By means of my linkage, I may open out the lower portion of the scale and compress the upper portion of the scale till further as illustrated in Fig. 5. Referring to Fig. 6, in which the current-responsive bimetallic unit 14 and the pointer 20 are represented schematically, it will be seen that the pin 22 tends to move along an arc 30 approximately about an apparent center 31. By adjusting the position of the bracket 26, the stop or fulcrum 24 may be positioned to obtain any one of a wide variety of scale laws. In the arrangement of Fig. 6, the fulcrum 24 is nearer to the zero end 33 of the arc 30 than to the full scale end 34 of the arc 30. Consequently, for small current values, a predetermined change in deflection of the pin 22 will cause a relatively greater deflection of the pointer 20 than the same change in deflection of the pin 22 when the current values are greater. In the former case, the pointer moves from the position A to the position B but, in the latter case, it moves only from the position C to the position D.

On the other hand, as illustrated in Fig. 7, by positioning the fulcrum 24 nearer the end 34 of the arc 30 than to the end 33, the scale may be expanded in the upper portion and compressed in the lower portion. In this case, the same deflection of the pin 22 causes the pointer 20 to move from A' to B' in the lower portion of the scale and from C' to D' in the upper portion of the scale. Other adjustments of the fulcrum may similarly be employed for obtaining other variations in scale law.

Although I have illustrated and described the application of my invention to an indicating instrument responsive to current or voltage, it will be understood that my invention is not limited to this specific type of current-responsive device but, obviously, includes relays, recorders, contact-making meters, and other current-responsive devices.

In the arrangement of Fig. 8, the current-free arm 18' is mounted below the current-carrying arms 16' and 17' of the current-responsive torque and deflection-producing unit 14, and all the brackets 12', 13', and 26' for supporting the bimetallic strips are mounted suitably insulated upon a common base plate or upon a member 35 adjustably mounted upon the base 11 to permit adjusting the pointer 20 in relation to the scale (not shown) without varying the relationships between the deflection of the various elements. The member 35 has a supporting flange 42 adapted to be secured to the instrument base 11. To permit adjustment there may be elongated slots 43 in the flange 42 adapted to receive screws 44 threaded into the base 11. The brackets 12', 13', and 26' are in turn adjustably mounted upon the member 35. For example, the bracket 26' may be arranged to pivot about the screw 28 inserted in a hole 28' in the member 35. There may be an elongated arcuate slot 36' adapted to receive a bolt 37' for securing the bracket 26' in a desired position upon the member 35. (See Fig. 10.) For adjustably securing the brackets 12' and 13' there may be a wing 45 extending from the member 35, having a round opening 46 and an elongated arcuate slot 47 cooperating with the securing bolts 48 and 49. By placing the current-free arm 18' below the current-carrying arms 16' and 17' instead of above, the readings of the device are made substantially independent of the position in which it is placed. The current-free arm 18' is affected to approximately the same extent by heat dissipated from the current-carrying arms 16' and 17' whether the base 11 is in a horizontal or a vertical position since in either case the arm 18' is out of the main path of convection from the arms 16' and 17'. Therefore, in either mounting position of the instrument, approximately the same rapidity of response of the pointer 20 may be obtained by virtue of the heat conveyed to the current-free arm 18' from the current-carrying arms 16' and 17'.

As explained more in detail in my copending application, Serial No. 735,227, ordinary bimetallic instruments have a large time lag owing to the gradual creepage of the bimetallic elements to their ultimate positions as their temperature approaches its ultimate value at which losses and heat supplied by the measured current are in equilibrium. By arranging the apparatus so that the current-free arm is exposed to heat dissipated from the current-carrying arms, the relative downscale creepage of the current-free arm as it approaches its ultimate temperature cancels the upscale creepage of the current-conducting arms as they approach their ultimate temperatures and the free end of the current-free arm reaches its ultimate position promptly, remaining there although the current-carrying and current-free arms may continue to bend for some time.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A current-responsive instrument comprising in combination, an E-shaped sheet of bimetal, a pair of current-conducting terminals attached to the ends of two of the arms forming said E and supporting said bimetal sheet, a pointer pivotally mounted on the end of the remaining arm forming said E, a biasing spring secured to said pointer and said arm and tending to rotate the former, and a bimetallic strip supported at one end with its remaining end in the path of said pointer and serving as a stop therefor, the arrangement being such that deflection of said bimetallic strip with variations in temperature moves the end thereof, serving as a stop, along said pointer toward and away from the pivot axis of said pointer.

2. A current-responsive device comprising in combination, a bimetallic current-responsive deflecting unit supported at one end and free to move at the other end, a pointer pivotally mounted on the free end of said unit, means tending to rotate said pointer in a given direction, and a bimetallic strip supported at one end with its remaining end in the path of said pointer serving as a stop therefor, the arrangement being such that deflection of said bimetallic strip with variations in temperature moves the end thereof, serving as a stop, along said pointer toward and away from the pivot axis of said pointer.

3. A current-responsive device comprising in combination, a thermal-responsive deflecting unit supported at one end and free to move at the other end, means for causing the unit to be heated in dependence upon variation in current to be measured, a pointer pivotally mounted on the free end of said unit, means tending to rotate said pointer in a given direction, and a temperature-responsive deflecting strip supported at one end with its remaining end in the path of said pointer serving as a stop therefor, the arrangement being such that the deflection of said temperature-responsive strip with variations in temperature moves the end thereof, serving as a stop, along said pointer toward and away from the pivot axis of said pointer.

4. A current-responsive device comprising in combination, a thermal current-responsive deflecting unit supported at one end and free to move at the other end, a pointer pivotally mounted on the free end of said unit with a pivot axis having such a direction as to be moved parallel to itself as the free end of said unit deflects, means tending to rotate said pointer in a given direction, and a temperature-responsive deflecting strip supported at one end with its remaining end in the path of said pointer serving as a stop therefor, the arrangement being such that deflection of said temperature-responsive strip with variations in temperature moves the end thereof, serving as a stop, along said pointer toward and away from the pivot axis of said pointer.

5. A current-responsive device comprising in combination, a thermal current-responsive deflecting unit supported at one end and free to move at the other end from a zero position toward a full scale position as the current to be measured increases from a zero value, a pointer pivotally mounted on the free end of said unit with a pivot axis in such a direction as to be moved parallel to itself as the free end of said unit is moved, means tending to rotate said pointer in a given direction, and a deflecting temperature-responsive strip supported at one end with its remaining end in the path of said pointer serving as a stop therefor, said strip being so mounted that the approximate line of motion of said stop is parallel to the direction of said pointer when said thermal current-responsive unit is in its zero position.

6. A current-responsive device comprising in combination, a thermal current-responsive deflecting unit supported at one end and free to move at the other end, a pointer pivotally mounted on the free end of said unit, means tending to rotate said pointer in a given direction, and a temperature-responsive deflecting strip supported at one end with its remaining end in the path of said pointer serving as a stop therefor, the arrangement being such that the deflection of said temperature-responsive deflecting strip with variations in temperature moves the end thereof serving as a stop along said pointer toward the pivot axis thereof as the ambient temperature rises, and away from the pivot axis thereof as the ambient temperature falls.

7. A current-responsive device comprising in combination, a thermal current-responsive deflecting unit supported at one end and free to move at the other end substantially along an arc from a zero position as the current increases from zero, a pointer pivotally mounted on the free end of said unit with a pivot axis in such a direction as to be moved parallel to itself by movement of the free end of said deflecting unit, means tending to rotate said pointer in a given direction, and a temperature-responsive deflecting strip supported at one end with its remaining end in the path of said pointer serving as a stop therefor, the arrangement being such that deflection of said temperature-responsive strip with variations in temperature moves the end thereof, serving as a stop, along said pointer toward and away from the pivot axis of said pointer and, at a given temperature, said stop is closer to the position assumed by the pivot axis of said pointer at zero current than to the position assumed by said pivot axis at full scale current.

8. A current-responsive device comprising in combination, a thermal current-responsive deflecting unit supported at one end and free to move at the other end, a pointer pivotally mounted on the free end of said unit, carried thereby, and with a pivot axis having such a direction as to be moved parallel to itself as the free end of said unit moves, means tending to rotate said pointer in a given direction with respect to the free end of said unit, and a stop in the path of said pointer serving as a fulcrum about which said pointer is rotated as the free end of said unit deflects.

9. A current-responsive device comprising in combination, a thermal current-responsive deflecting unit supported at one end and free to move at the other end, a pointer pivotally mounted on the free end of said unit with a pivot axis in such a direction as to be moved parallel to itself as the free end of said unit moves, means tending to rotate said pointer in a given direction, and a stop in the path of said pointer serving as a fulcrum about which said pointer is rotated as the free end of said unit deflects, the position of said stop being such that the pivot axis of said pointer is moved farther away from said stop as said unit deflects.

10. A current-responsive device comprising in combination, a thermal current-responsive deflecting unit supported at one end and free to move at the other end, a pointer pivotally mounted on the free end of said unit with a pivot axis in such a direction as to be moved parallel to itself as the free end of said unit moves, means tending to rotate said pointer in a given direction, and a stop in the path of said pointer serving as a fulcrum about which said pointer is rotated as the free end of said unit deflects, the arrangement being such that the distance between said pivot axis and said stop is progressively varied in a given direction as said unit deflects in a given direction.

THEODORE A. RICH.